Nov. 24, 1931.  A. J. COLLOCOTT  1,833,603
CLAW HAMMER AND OTHER LIKE TOOL FOR EXTRACTING NAILS AND THE LIKE
Filed April 5, 1928
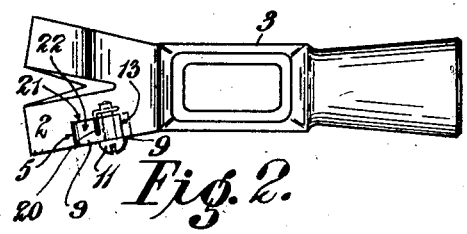
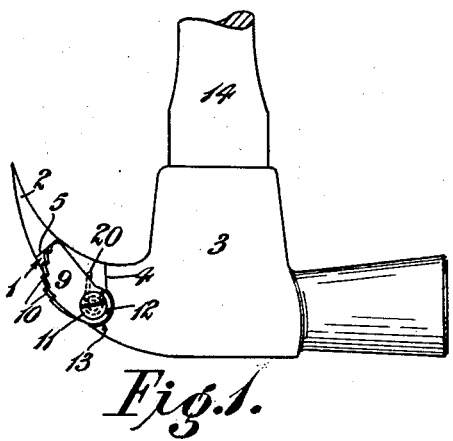
INVENTOR
ALBERT JAMES COLLOCOTT.
By
ATTORNEY Patented Nov. 24, 1931

1,833,603

UNITED STATES PATENT OFFICE

ALBERT JAMES COLLOCOTT, OF SOUTH MELBOURNE, VICTORIA, AUSTRALIA

CLAW HAMMER AND OTHER LIKE TOOL FOR EXTRACTING NAILS AND THE LIKE

Application filed April 5, 1928, Serial No. 267,712, and in Australia April 14, 1927.

This invention refers to claw hammers and tools of like kind provided with claws such for example as slaterers hammers, pinch bars and case openers and to the kind in which a spring controlled member is pivotally mounted in a recess in the outer side of the claw.

In known constructions of the kind the end of the gripping member on the opposite side of the pivot to its serrated gripping face is quite free of the adjacent side of the recess in the claw and consequently when the leverage strain is applied to the tool to extract a strongly bedded nail or the like the pivot of the gripping member is likely to be sheared.

The object of this invention is to provide a more suitable mounting for the gripping member which is strongly backed against the leverage strain so that the pivot will not be bent or sheared.

The invention is illustrated as applied to a claw hammer by the accompanying drawings whereof, Figure 1 is a side elevation of the head of a claw hammer.

Figure 2 is a plan of the head of the tool.

In the recess is located a gripper 9 formed with a cam shaped serrated nail engaging head 10 said gripper being mounted on a pivotal rivet or pin 11 fixed in the back wall 21 of the recess.

The backing end 12 of the gripper is rounded and fits in and bears against a correspondingly curved seating 13 formed in the side 4 of the recess. This construction ensures a strong backing for the gripper when the tool is being used to extract a nail and prevents the rivet 11 being sheared under the leverage strain.

By means of this construction nails and the like of various thicknesses may be engaged and gripped in the recess.

The head of the tool is provided with a spring 20 located in a seating in the wall 21 of the recess 1, the operative end of which bears against one side 22 of the gripper 9 and prevents rattling of the same when the tool is being used as a hammer.

When in inoperative position the serrated end 10 of the gripper is kept in contact with the side 5 of the recess by the spring 20.

In operation the tool is moved laterally against the nail or the like to be extracted when by a slight pressure of the cam shaped serrated end 10 of the gripper against the nail said gripper moves on its pivot 11 sufficiently to enable the nail to be engaged between the said serrated end and the side 5 of the recess. When the tool is then levered to extract the nail the gripper will not yield nor its pivot shear on account of the rounded end of the gripper being rigidly backed in the recess.

I claim:

A claw for the extraction of nails having a recess therein, said recess having a side substantially radial to the arch of the claw, a gripper pivotally mounted adjacent the other side of the recess and having an eccentric face adapted to coact with said first side to grip a nail therebetween, the pivotal end of said gripper being circular, said second side of the recess having a substantially semi-circular seat therein fitting said circular end of the gripper so as to allow relative rotary movement therebetween while preventing movement of said gripper away from said first side so as to take the strain off said pivot.

In witness whereof I have signed this specification.

A. J. COLLOCOTT.